US004001669B2

United States Statutory Invention Registration [19]

[11] Reg. Number: H1669

Matayabas, Jr. et al.

[45] Published: Jul. 1, 1997

[54] COPOLYESTER-ETHER POLYMERS

[75] Inventors: James C. Matayabas, Jr.; James T. Tanner, III, both of Kingsport, Tenn.; Robert M. Finch, Richmond, Va.

[73] Assignee: Eastman Chemical Company, Kingsport, Tenn.

[21] Appl. No.: 742,396

[22] Filed: Nov. 4, 1996

[51] Int. Cl.[6] ..... C08G 63/66

[52] U.S. Cl. ..... 528/300

*Primary Examiner*—Charles T. Jordan
*Assistant Examiner*—Meena Chelliah
*Attorney, Agent, or Firm*—Cheryl J. Tubach; Harry J. Gwinnell

[57] ABSTRACT

A segmented copolyester-ether polymer comprises 9.5 to 33 percent by weight hard segment residues of polybutylene terephthalate and 0.5 to 67 percent by weight soft segment residues of a polyether polyol comprised of n units of residue (1) and m units of residue (2), wherein the total value of n+m is in the range 2 to 70, m/(n+m) is in the range 0.05 to 0.98, and residues (1) and (2) have the structures:

$$-O-CH_2-\underset{\underset{CH_2CH_3}{|}}{CH}- \quad \text{and} \quad -O-CH_2-CH_2-CH_2-CH_2-$$

(1) (2)

The polyether polyol is further characterized in that at least 95 percent of the hydroxyl groups are primary hydroxyl groups.

3 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COPOLYESTER-ETHER POLYMERS

TECHNICAL FIELD

This invention relates to copolyester-ether polymers and more specifically to copolyester-ethers comprising polybutylene terephthalate hard segments and certain polyether soft segments.

BACKGROUND OF THE INVENTION

Polytetramethylene glycol is the industry standard for copolyester-ether soft segments. A wide variety of compositions ranging from hard plastics to tough elastomers to soft gums may be prepared depending upon the concentration and molecular weight of the polytetramethylene glycol soft segment.

U.S. Pat. No. 3,023,192 discloses other copolyester-ethers containing aromatic diesters residues, organic diol residues, and polyether glycol residues.

J. R. Wolfe, Jr. [Rubber Chemistry and Technology, Vol. 50, no. 4, (Sep./Oct. 1977)] teaches that titanate-ester-catalyzed melt condensation copolymerizations of polypropylene glycol having number average molecular weight of about 1000 with dimethyl terephthalate and 1,4-butanediol give copolyester-ethers having low inherent viscosities and poor properties as compared to copolyester-ethers prepared using polytetramethylene glycols of similar molecular weight. This is due largely to the high rate of thermal degradation of the polypropylene glycol at the polymerization temperatures (255° C). Wolfe also teaches that the effect of having secondary hydroxyls rather than primary hydroxyls is minor as using ethylene oxide capped polypropylene glycols gives only marginal improvement in the inherent viscosity. The use of higher molecular weight polypropylene glycols, up to a number average molecular weight of about 2000, was found to give materials with greatly diminished properties due to the insolubility of the higher molecular weight species in the polymerization melt.

U.S. Pat. No. 5,466,759 discloses saturated polyether polyols having at least 98 percent primary terminal hydroxyl groups and comprising n repeat units of residue (1) and m repeat units of residue (2), wherein residues (1) and (2) have the structures:

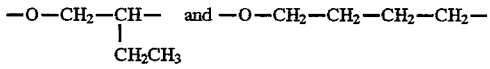

(1) (2)

and m+n is in the range 2 to 70 and m/(n+m) is in the range 0.05 to 0.98. These polyether polyols are prepared by first polymerizing 3,4-epoxy-1-butene to produce unsaturated polyether precursors comprising residues (3) and (4) having the structures:

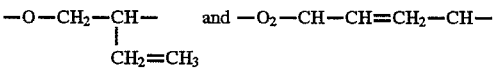

(3) (4)

and then hydrogenating the unsaturated polyether precursors.

A series of papers [L. P. Blanchard, et al., J. Polym. Sci., Part A-1, 9(12), 3547–54 (1971); L. P. Blanchard, et al., Kinet. Mech. Polyreactions, Int. Symp. Macromol. Chem., Prepr., Volume 1, 395–9. Akad. Kiado: Budapest, Hung. (1969); and J. M. Hammond, J. Polym. Sci., Part A-1, 9(2), 265–79 (1971)] teach that a mixture of cyclic oligomers and polyether glycols containing residue (1) and minor amounts of residue (2) can be prepared by the copolymerization of 1,2-butylene oxide and tetrahydrofuran in the presence of boron trifluoride etherate and a glycol initiator.

SUMMARY OF THE INVENTION

A segmented copolyester-ether polymer comprises 99.5 to 33 percent by weight hard segment residues of polybutylene terephthalate and 0.5 to 67 percent by weight soft segment residues of a polyether polyol comprised of n units of residue (1) and m units of residue (2), wherein the total value of n+m is in the range 2 to 70, m/(n+m) is in the range 0.05 to 0.98, and residues (1) and (2) have the structures:

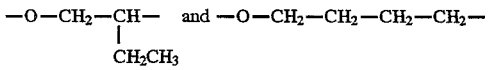

(1) (2)

The polyether polyol is further characterized in that at least 95 percent of the terminal hydroxyl groups are primary.

DESCRIPTION OF THE INVENTION

The copolyester-ether polymers provided by the present invention comprise 99.5 to 33 percent by weight hard segment residues of poly(butylene terephthalate) and 0.5 to 67 percent by weight soft segment residues of a saturated polyether polyol comprising of n units of residue (1) and m units of residue (2), wherein the total value of n+m is in the range 2 to 70 and m/(n+m) is in the range 0.05 to 0.98, i.e., residue (2) constitutes from 5 to 98 mole percent of the total moles of residues (1) and (2), and residues (1) and (2) have the following structures:

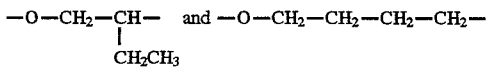

(1) (2)

The polyether polyols are further characterized in that at least 95 percent of the hydroxyl groups are primary (rather than secondary) hydroxyl groups. The primary hydroxyl groups are more reactive for condensation polymerization and require shorter polymerization times.

The copolyester-ether polymers may optionally be modified by the incorporation of a small amount, e.g., 10 percent by weight, difunctional monomers for the purpose of altering polymer properties. Examples of suitable glycolic monomers include cyclohexane-dimethanol, neopentyl glycol, ethylene glycol, diethylene glycol, and the like. Examples of suitable diacid monomers includes naphthalene dicarboxylic acid, isophthalic acid, and the like.

The copolyester-ether polymers may optionally be further modified by the incorporation of small amounts, e.g., 1 percent by weight, multifunctional monomers for the purpose of altering physical properties. Examples of multifunctional carboxyl monomers include trimellitic acid, trimellitic anhydride, pyromellitic acid, pyromellitic anhydride, and the like. Examples of multifunctional alcohols include glycerol, trimethylol propane, pentaerythritol, and the like.

The copolyester-ether polymers may optionally contain antioxidants such as Irganox® 1010 or Ethanox® J330, fillers such as talc or mica, reinforcing agents such as glass fiber, Kevlar®, or carbon fiber, conventional flame retardants such as phosphorus or halogen compounds, and the like compounds.

Blend modifiers may also be incorporated into the copolyester-ether polymers. For example, polyesters, polyamides such as nylon-6,6 from Du Pont, poly(ether-imides) such as Ultem®poly(ether-imide) from General Electric, polyphenylene oxides such as poly(2,6-dimethylphenylene oxide), or poly(phenylene oxide)/polystyrene blends such as the Noryl® resins from General Electric, polyesters, polyphenylene sulfides, polyphenylene sulfide/sulfones, poly(ester-carbonates), polycarbonates such as Lexan® polycarbonate from General Electric, polysulfones, polysulfone ethers, poly(ether-ketones) of aromatic dihydroxy compounds, and the like may be used to modify properties or to reduce flammability.

In general, the copolyester-ether polymers are melt processible elastomers or elastoplastics. The copolyester-ethers will have a wide range of uses, depending upon the physical properties, which are controlled by modification as described above.

The preferred process for making the copolyester-ether polymers is by melt polymerization which may be carried out in a batch, semi-continuous, or continuous mode of operation. The polymerization conditions of time, temperature, and pressure may vary substantially depending upon factors including the choice of monomers, the use of other diacids or diesters, choice of catalysts, amount of catalyst, inherent viscosity desired, and type of reactor used. Optimum conditions for melt polymerization depends on many process variables but can be readily ascertained by those skilled in the art.

The process to prepare the polyether polyols is also an integral part of the process to prepare the copolyester-ether polymers and is disclosed in U.S. Pat. No. 5,466,759, which is herein incorporated by reference. The polyether polyols are prepared by first polymerizing 3,4-epoxy-l-butene to produce unsaturated polyether precursors comprising residues (3) and (4) having the structures:

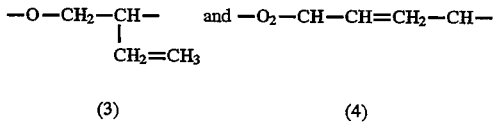

(3) (4)

and then hydrogenating the unsaturated polyether precursors. The hydrogenation advantageously is performed in the presence of a nickel hydrogenation catalyst.

The preparation of the copolyester-ether polymers and the operation of the process are further illustrated by the following examples.

EXAMPLES

Proton NMR spectra were obtained on a 300 MHz NMR spectrometer with samples dissolved in deuterated chloroform containing tetramethylsilane as an internal standard. The value of m/(n+m) was determined by comparison of the integrated proton NMR absorptions of residues (1) and (2). The value of m'/(n'+m') in Example 1 was determined by comparison of the integrated proton NMR absorptions of residues (3) and (4). Number average molecular weights (Mn) and polydispersity values (Mw/Mn) were determined using size-exclusion chromatography with refractive index detection in tetrahydrofuran using four 10 mm PLgel mixed-bed columns and calibrated using narrow molecular weight distribution polystyrene standards. Hydroxyl numbers were determined from titration of the acetic acid formed by the reaction of the sample with acetic anhydride. Inherent viscosities of copolyester-ethers were determined using 60/40 (wt/wt) phenol/tetrachloroethane at sample concentrations of 0.5 g/dL at 25° C. and reported in units of dL/g. Differential scanning calorimetry analyses were determined using a TA Instruments 912 Differential Scanning Calorimeter with nitrogen purge at a scan rate of 20° C./min. Thermogravimetric analyses were obtained using a TA Instruments TGA 2950 Thermogravimetric Analyzer with 40 psig nitrogen purge at a scan rate of 20° C./min.

Reference Example 1

This example illustrates the preparation of the polyether glycol used in the preparation of the copolyester-ether polymers of this invention.

A 16-L glass reactor having a nitrogen atmosphere and equipped with a thermocouple, mechanical stirrer, septum and reflux condenser with argon inlet was charged with 247 g (2.74 moles) of 1,4-butanediol, 5600 mL of methylene chloride and 2.5 mL of trifluoromethane sulfonic acid. While stirring, 5377 g (76.72 moles) of 3,4-epoxy-l-butene was added over a period of 11 hr (a rate of about 9 ml/min) by liquid pump. The temperature increased initially to about 42° C. gently refluxing the solvent and continued to rise reaching 58° C. near complete addition of the 3,4-epoxy-1-butene. After complete addition, the reaction was allowed to cool and was stirred for 1 hr. After adding 5000 mL of 5 percent sodium hydroxide solution to the reaction mixture, it was stirred for 30 min. Then the layers were allowed to separate. The bottom organic layer was removed, dried over anhydrous magnesium sulfate, filtered and evaporated to give a clear, yellow oil. The oil was purified further by passing through a wiped film evaporator with a temperature of 100° C. giving a yellow oil that was an unsaturated polyether glycol comprising n' repeat units of residue (3) and m' repeat units of residue (4), wherein n'+m' was about 15, m'/(n'+m') was 0.16, Mn=1200, Mw/Mn=1.59 and hydroxyl number=93.4.

A 5-Gal autoclave equipped with mechanical stirring was charged with 1250 g of unsaturated polyether glycol prepared as described above, 100 g of Raney-nickel (water wet) and 5000 mL of tetrahydrofuran. The autoclave was purged with nitrogen, pressurized with 500 psig hydrogen and then heated to 60° C. with stirring. The reaction was stirred at 60° C. and 500 psig for 12 hr. After cooling the pressure was released. The reaction mixture was removed, filtered, concentrated by evaporating the tetrahydrofuran under reduced pressure and then passed through a wiped film evaporator under high vacuum at 100° C. to give a clear, colorless oil. The oil was further purified by passing through a wiped film evaporator under high vacuum at 100° C. giving a clear colorless oil comprising n repeat units of residue (1) and m repeat units of residue (2), wherein n+m was about 16, m/(n+m) was 0.21, Mn=1150, Mw/Mn=1.47, hydroxyl number=92.0 and percent hydrogenation>99. The value for m/(n+m) was higher than the value of m'/(n'+m') because the 1,4-butanediol initiator fragment was identical to repeat unit (2) and was no longer distinguishable in the hydrogenated product.

Example 1

This example illustrates the preparation of a copolyester-ether polymer comprising 65 percent by weight poly (butylene terephthalate) residues and 35 percent by weight residues of the polyether glycol prepared in Reference Example 1.

A 100-mL flask was charged with the following reagents: 11.2 g (0.0100 mole) of the polyether glycol prepared in Reference Example 1, 19.4 g (0.100 mole) dimethyl terephthalate, 12.62 g (0.140 mole) 1,4-butanediol, 33.7 mg Irganox-1010 (about 2000 ppm in final polymer) and 12 mg titanium tetraisopropoxide (about 50 ppm Ti in final polymer). The flask was equipped with a polymer head having an argon/vacuum inlet, a short distillation column and a metal stirrer. The flask was given an argon atmosphere by alternating vacuum and argon three times. The flask was then placed in a Belmont metal bath preheated to 200° C., and with stirring under dynamic argon atmosphere, the contents of the flask formed a melt solution. The contents of the flask were heated at 200° C. with stirring for about 2 hr to effect ester interchange and distill methanol from the flask. Then the temperature was increased to 245° C., and a vacuum of 0.2 mm was gradually applied over the next 10 min. Full vacuum was maintained for about 45 min while the temperature was maintained at 245° C. A high melt viscosity, semi-crystalline polymer was obtained having inherent viscosity of 1.12. Thermal analyses showed a DSC peak melting point at 197° C. and a TGA 10 percent mass loss in nitrogen at 371° C. A 120-mil thick disc pressed at 245° C. had D-scale shore hardness of 45 and a density of 1.20 g/ml. Tensile properties obtained from 10-mil thick films pressed at 245° C. showed Young's modulus of 176 MPa, yield stress of 17 MPa, yield strain of 26 percent, break stress of 27 MPa and break strain of 400 percent.

Examples 2–5

These examples illustrate the preparation of the copolyester-ether polymers comprising poly(butylene terephthalate) residues and 9, 34, 45 and 60 percent by weight, respectively, residues of the polyether glycol prepared in Reference Example 1. The polymers were prepared largely as described in Example 1 and are described in Table 1.

TABLE 1

| Analyses of Examples 3–6 | | | | | |
|---|---|---|---|---|---|
| Example | 2 | 3 | 4 | 5 | 6 |
| Wt. % PPBG | 9 | 34 | 36 | 45 | 60 |
| Reaction Time | | | | | |
| Total (minutes) | 153 | 167 | 120 | 162 | 149 |
| Vacuum (minutes) | 82 | 90 | 45 | 59 | 34 |
| Inherent Viscosity (dL/g) | 1.12 | 1.08 | 1.12 | 1.1 | 0.417 |
| DSC | | | | | |
| Tm (°C.) | 222 | 194 | 197 | 180 | 127 |
| Tg (°C.) | | −32 | −26 | −36 | −42 |
| DMA | | | | | |
| T (tanδmax) (°C.) | — | −18 | −18 | −27 | — |
| tanδmax | — | 0.195 | 0.185 | 0.342 | — |
| TGA | | | | | |
| 10% Mass Loss in Air (°C.) | 360 | 347 | | 321 | 314 |
| Shore Hardness (D Scale) | 47 | 44 | 44 | 39 | 13 |
| Density (g/ml) | 1.29 | 1.21 | 1.20 | 1.18 | 1.11 |
| Young's Modulus (MPa) | 768 | 165 | 157 | 84 | — |

Comparative Example 1

This example illustrates the preparation of a comparative copolyester-ether comprising 67 percent by weight poly (butylene terephthalate) residues and 33 percent by weight polytetramethylene glycol (PTMG) residues.

A 100-mL flask was charged with the following reagents: 10.6 g (0.0100 mole) of polytetramethylene glycol (MW 1000, Aldrich Cat. No. 34,529-6), 19.4 g (0.100 mole) dimethyl terephthalate, 12.62 g (0.140 mole) 1,4-butanediol, 33.7 mg Irganox-1010 (about 2000 ppm in final polymer) and 12 mg titanium tetraisopropoxide (about 50 ppm Ti in final polymer). The flask was equipped with a polymer head having an argon/vacuum inlet, a short distillation column and a metal stirrer. The flask was given an argon atmosphere by alternating vacuum and argon three times. The flask was then placed in a Belmont metal bath preheated to 200° C., and with stirring under dynamic argon atmosphere, the contents of the flask formed a melt solution. The contents of the flask were heated at 200° C. with stirring for about 2 hr to effect ester interchange and distill methanol from the flask. Then the temperature was increased to 245° C., and a vacuum of 0.2 mm was gradually applied over the next 10 min. Full vacuum was maintained for about 45 min while the temperature was maintained at 245° C. A high melt viscosity, semi-crystalline polymer was obtained having inherent viscosity of 1.17 g/dL. Thermal analyses showed a DSC peak melting point at 197° C. and TGA 10 percent mass loss in nitrogen at 371° C. A 120-mil thick disc pressed at 245° C. had D-scale shore hardness of 53 and a density of 1.20 g/ml. Tensile properties obtained from 10-mil thick films pressed at 245° C. showed Young's modulus of 194 MPa, yield stress of 18 MPa, yield strain of 31 percent, break stress of 38 MPa and break strain of 680 percent.

Comparative Examples 2–5

These examples illustrate the preparation of comparative copolyester-ethers using polytetramethylene glycol. The polymers were prepared largely as described in Comparative Example 1 and are described in Table 2.

TABLE 2

| Analyses of Comparative Examples 2–5 | | | | |
|---|---|---|---|---|
| Example | 2 | 3 | 4 | 5 |
| Wt. % PTMG | 9 | 29 | 44 | 66 |
| Reaction Time | | | | |
| Total (minutes) | 132 | 146 | 150 | 142 |
| Vacuum (minutes) | 61 | 36 | 40 | 39 |
| Inherent Viscosity (dL/g) | 0.925 | 0.965 | 1.02 | 0.661 |
| DSC | | | | |
| Tm (°C.) | 226 | 215 | 195 | 141 |
| Tg (°C.) | — | −16 | −19 | — |
| DMA | | | | |
| T (tanδmax) (°C.) | — | −26 | −52 | — |
| tanδmax | — | 0.099 | 0.185 | — |
| TGA | | | | |
| 10% Mass Loss in Air (°C.) | 370 | 350 | 336 | 245 |
| Shore Hardness (D Scale) | 44 | 54 | 41 | 18 |
| Density (g/ml) | 1.25 | 1.21 | 1.16 | 1.09 |
| Young's Modulus (MPa) | 886 | 326 | 110 | — |

Comparative Example 6

This example illustrates the preparation of a comparative copolyester-ether comprising 67 percent by weight poly (butylene terephthalate) residues and 33 percent by weight polybutylene glycol (PBG) residues, wherein the polybutylene glycol contains only secondary hydroxyl groups.

A 100-mL flask was charged with the following reagents: 10.0 g (0.0100 mole) of polybutylene glycol (MW 1000, Dow Chemical Co. research sample of B100-1000, Lot No. TB920421-3936), 19.4 g (0.100 mole) dimethyl terephthalate, 12.6 g (0.140 mole) 1,4-butanediol, 33.7 mg Irganox-1010 (about 2000 ppm in final polymer) and 12 mg titanium tetraisopropoxide (about 50 ppm Ti in final polymer). The flask was equipped with a polymer head having an argon/vacuum inlet, a short distillation column and a metal stirrer. The flask was given an argon atmosphere by alternating vacuum and argon three times. The flask was then placed in a Belmont metal bath preheated to 200° C., and with stirring under dynamic argon atmosphere, the contents of the flask formed a melt solution. The contents of the flask were heated at 200° C. with stirring for about 4.5 hr then heated at 220° C. with stirring for about 3 hr to effect ester interchange and distill methanol from the flask. Then the temperature was increased to 245° C., and a vacuum of 0.3 mm was gradually applied over the next 5 min. The melt viscosity increased slowly, and full vacuum was maintained for about 2.2 hr while the temperature was maintained at 245° C. A semi-crystalline polymer was obtained having inherent viscosity of 0.84 g/dL. Thermal analyses showed a DSC peak melting point at 213° C. and TGA 10 percent mass loss in nitrogen at 361° C.

The polymer product was ground to pass a 20 mesh (850 micron) screen, dried under vacuum at 100° C. and then subjected to solid state polymerization by slowly increasing the temperature from 160° to 200° C. over a period of 4 hr while maintaining vacuum of 0.1 mm Hg then holding at 200° C. for 2 hr while maintaining vacuum of 0.1 mm Hg, giving a high-molecular weight polymer having inherent viscosity of 1.05 g/dL. Thermal analyses showed a DSC peak melting point at 216° C. and TGA 10 percent mass loss in nitrogen at 356° C. A 120-mil thick disc pressed at 245° C. had D-scale shore hardness of 52 and a density of 1.20 g/ml. Tensile properties obtained from 10-mil thick films pressed at 245° C. showed Young's modulus of 130 MPa, yield stress of 14 MPa, yield strain of 32 percent, break stress of 27 MPa and break strain of 400 percent.

The copolyester-ether polymers of the present invention have a cost advantage over similar materials of the prior art because (i) the polyether polyol used to prepare the copolyester-ether polymer are typically available at a cost below that of polytetramethylene glycol, which is the industry standard, and (ii) the copolyester-ether polymer of this invention may be prepared directly from the melt within rather short reaction times due to the primary hydroxyl groups of the polyether polyol used.

We claim:

1. A segmented copolyester-ether polymer comprising:

(a) 99.5 to 33 percent by weight hard segment residues of polybutylene terephthalate and (b) 0.5 to 67 percent by weight soft segment residues of a polyether polyol comprising:

(i) n units of residue (1) having the formula:

$$-CH_2-\underset{\underset{CH_2CH_3}{|}}{CH}- \quad (1)$$

and (ii) m units of residue (2) having the formula:

$$-O-CH_2-CH_2-CH_2-CH_2- \quad (2)$$

wherein the total value of n+m is in the range 2 to 70, m/(n+m) is in the range 0.05 to 0.98.

2. The segmented copolyester-ether polymer of claim 1 wherein the polyether polyol has at least 95 percent primary terminal hydroxyl groups.

3. The segmented copolyester-ether polymer of claim 1 prepared by melt condensation polymerization.

* * * * *